United States Patent [19]
Rosen et al.

[11] Patent Number: 5,983,272
[45] Date of Patent: Nov. 9, 1999

[54] OPTION REQUEST PROTOCOL

[75] Inventors: Jonathan Rosen, Chapel Hill, N.C.; Dean Hiller, Shrub Oak, N.Y.; Robert O'Gorman, Raleigh, N.C.; Mark C. Drummond, Catonsville, Md.

[73] Assignee: Cisco Technology, Inc., San Jose, Calif.

[21] Appl. No.: 08/920,714

[22] Filed: Aug. 29, 1997

[51] Int. Cl.⁶ .................................................. G06F 13/00
[52] U.S. Cl. ........................ 709/227; 709/228; 710/11; 710/14; 710/16
[58] Field of Search ................... 395/200.57, 200.58, 395/200.66; 370/254; 710/15, 16, 11, 14; 709/227, 228, 236

[56] References Cited

U.S. PATENT DOCUMENTS

| | | | |
|---|---|---|---|
| 5,014,265 | 5/1991 | Hahne et al. . | |
| 5,072,449 | 12/1991 | Enns et al. . | |
| 5,128,945 | 7/1992 | Enns et al. . | |
| 5,260,936 | 11/1993 | Bardet et al. . | |
| 5,280,470 | 1/1994 | Buhrke et al. . | |
| 5,386,512 | 1/1995 | Crisman et al. | 395/200.58 |
| 5,430,842 | 7/1995 | Thompson et al. . | |
| 5,491,802 | 2/1996 | Thompson et al. | 395/200.66 |
| 5,546,549 | 8/1996 | Barrett et al. | 395/200.12 |
| 5,555,374 | 9/1996 | Armerding et al. . | |
| 5,621,894 | 4/1997 | Menezes et al. | 395/200.57 |
| 5,632,021 | 5/1997 | Jennings et al. | 395/309 |
| 5,636,371 | 6/1997 | Yu | 370/254 |
| 5,663,952 | 9/1997 | Gentry, Jr. . | |
| 5,699,532 | 12/1997 | Barrett et al. | 395/200.2 |

OTHER PUBLICATIONS

ESCON, "Enterprise Systems Connection Adapter User's Guide and Service Information", IBM, 1993, pp. 6.1–6.16.
AIX Version 3.2 "Enterprise Systems Connection Adapter: User's Guide and Service Information", IBM, 1993, pp. 1.1–9.8.

*Primary Examiner*—Glenton B. Burgess
*Assistant Examiner*—Chuong Ho
*Attorney, Agent, or Firm*—Cesari & McKenna

[57] ABSTRACT

An option request protocol allows dynamic negotiation of options between a host computer and a control unit of a computer network. The protocol is manifested as an exchange of novel control messages over a control link used to establish logical data links for communication between the host and control unit. The options negotiated by the control message exchange generally pertain to additional functions performed by the control unit or host, or additional parameters for communication over the data links coupling the control unit and host.

20 Claims, 4 Drawing Sheets

OPTION REQUEST PROTOCOL

CROSS-REFERENCE TO RELATED APPLICATIONS

This invention is related to the following copending U.S. patent applications:

U.S. patent application Ser. No. 08/921,158 titled, IP Checksum Offload, filed Aug. 29, 1997; and U.S. patent application Ser. No. 08/920,713 titled, Method and Apparatus for Dynamic Link Name Negotiation, filed Aug. 29, 1997.

BACKGROUND OF THE INVENTION

Data communication in a computer network involves the exchange of data between two or more entities interconnected by communication links. The entities are typically software programs executing on hardware computer platforms, such as nodes; in particular, communication software executing on the nodes correlate and manage data communication with other nodes. The nodes typically communicate by exchanging discrete packets or frames of data according to predefined protocols. In this context, a protocol consists of a set of rules defining how the nodes interact with each other. Collectively, these hardware and software components comprise a communications network and their interconnections are defined by an underlying architecture.

Modern communications network architectures are typically organized as a series of hardware and software levels or "layers" within each node that interact to format data for transfer over the network. Predetermined services are performed on the data as it passes through each layer and the layers communicate with each other by means of the predefined protocols. The lower layers of these architectures are typically implemented in hardware and firmware, whereas the higher layers are generally implemented in the form of software running on the nodes attached to the network. Examples of such communications architectures include the the Internet communications architecture and the Systems Network Architecture (SNA) developed by International Business Machines (IBM) Corporation.

SNA is a mainframe-oriented network architecture that includes services generally similar to those defined in the Internet communications architecture. An SNA network consists of nodes and links, wherein the nodes are network components containing protocol implementations and the links are transmission facilities that carry data between two nodes configured to operate a data link control procedure. Examples of such nodes include a host mainframe computer, a control unit and an input/output (I/O) device that provides a user interface to the network. In one embodiment of the SNA network, the control unit and I/O device may be combined within a node, such as a workstation and in another embodiment, the control unit may be independent of the workstation and include a router to enable routing of data through the network to destination nodes, such as workstations.

The host is typically connected to the control unit through a high-performance communication subsystem called a mainframe channel. The channel comprises a plurality of components including an intelligent processor (i.e., channel CPU) that manages the protocol over the communications link and controls transfer of data between host (main memory) storage and I/O devices directly attached to the control unit. To that end, a channel may use one or more channel paths as the actual links between a host and the control unit. Channel paths include physical transmission links between the channel and control unit; examples of channel paths include bus-and-tag and enterprise system connection (ESCON) channel paths. Moreover, each I/O device is represented by a subchannel. A subchannel is similar to a virtual circuit in that it provides information about the associated I/O device and its attachment to the channel.

To transfer data in connection with an I/O operation, the channel CPU executes channel command words (CCWs) once started by a start subchannel operation. The start subchannel command is issued by the host CPU to instruct the channel CPU as to the location of a channel program; this command also specifies the subchannel on which the channel program should execute. The channel program consists of a collection of CCWs; the CCWs are the actual I/O commands (read, write, status, etc) that cause information to flow between the host and an I/O device. The control unit interprets these CCWs and adapts them to fit the characteristics of different I/O devices. Upon issuing a start subchannel operation, the host CPU is released to pursue other processing while the channel organizes the data referenced by the channel program and synchronizes its transfer between the I/O device and main memory.

Communication between a channel and control unit is typically governed by various protocols; a protocol originally developed by IBM Corporation for improving the efficiency of data communication between a host computer and a control unit is the common link access to workstation (CLAW) protocol. In a CLAW environment, the control unit is logically coupled to a CLAW device, which is typically a software entity executing on a node, such as a workstation. Data communication takes place over a channel via the exchange of data packets between the workstation and host. The CLAW protocol achieves data communication efficiency, in part, by avoiding host CPU interrupts during I/O operations through the continuous execution of channel programs over a subchannel dedicated to write operations and another subchannel dedicated to read operations.

Logical links are defined in CCWs for these read and write operations to establish multiple logical connections within each subchannel directed to different applications executing on the host and workstation. In fact, a main goal of the CLAW protocol is to enable efficient switching among applications specified by the logical links to facilitate data transfers to appropriate outbound interfaces (e.g., FDDI or Ethernet). Accordingly, the logical links are a way to multiplex within a subchannel.

The CLAW protocol generally defines (i) command codes associated with CCWs and (ii) the order in which those command codes are specified in a CCW chain. A logical link number (0–31) is embedded in the CCW command code, wherein number 0 is reserved for a control link and numbers 1–31 specify application-to-application (data) links. The control link path is part of a read/write subchannel pair dedicated to CLAW protocol communication. The host CPU builds a channel program comprising a chain of CCW data structures in main memory that contain instructions (e.g., read, read header, write, transfer-in-channel (TIC)). These instructions are then executed in accordance with the CLAW protocol.

The CLAW protocol also defines two primary sets of control flows over the control link: system validate/system validate response and connection request sequence. The system validate/system validate response control flows are manifested as message packets that propagate over the control link, passing information as data within a predetermined packet format. Before sending data, a system validate/response message flow occurs over the control link to verify the names of the workstation and host.

The workstation and host names are configuration parameters used to ensure that the host is communicating with the proper workstation. If the workstation (or host) name contained in the system validate message is incorrect, a control application provides a non-match return code in the system validate response message along with the expected name. Upon completion of the system validate/response exchange, the control link (0) has been brought up and the host is "aware" of the workstation to which it is connected. However, logical data links still need to be established for application-to-application data communication.

In order to establish a data link between two communicating applications, a connection request sequence is executed between the host and workstation. A control application resident on the host is typically responsible for initiating the connection request sequence to establish logical links (1–31) for data transfers between applications. A channel adapter within the control unit/workstation controls logical link assignments for applications executing on the workstation. The connection request sequence operates to establish the actual links used for host application-to-workstation application data transfers; once established, various types of data flow over these application-application links 20 (e.g., a Transmission Control Protocol/Internet Protocol (TCP/IP) application has IP packets flowing over the link).

The connection request originates in the host over control link 0 and is sent to the channel adapter which selects an available link and alters the connection request to reference that link. The adapter then passes the connection request onto the targeted application of the workstation. The channel adapter sends the connection response back to the host over the control link. If the workstation does not agree with the name of its application specified in the request, it returns a disconnect command; otherwise, a connection confirm response is provided to the host and the link is ready for data transfer.

The host CPU then issues a start subchannel (SSCH) command to the channel CPU instructing that latter CPU to initiate an I/O operation to the targeted application. The channel CPU executes the SSCH command, which points to the beginning of a CCW chain of a channel program in main memory. In the case of a read (or write) channel program, the channel CPU gains control of the program, reads each CCW in sequence and executes it to initiate the flow of data, along with the CCW command code, over the physical channel wire and through the control unit between the host main memory and the targeted application.

For each received CCW command code, the control unit responds with either "Yes", "Invalid Command" or "Busy". A yes response is followed by execution of the CCW command. Either the channel or the control unit can terminate an I/O operation. Termination implies that the targeted application has received or provided all data associated with the I/O operation and no longer requires channel facilities. Control unit initiated I/O termination indicates that the I/O operation has completed and the control unit is ready to execute another operation.

The conventional CLAW protocol described above "statically" configures the network system with respect to the functions performed by the control unit or host, or the parameters defining communication over the data links coupling the control unit and host. For example, the host and workstation names are statically configured parameters of the system validate/system validate response exchange, as are the maximum read and write CCW sizes that are sent during the exchange. There is currently no way to negotiate optional functions or parameters in a dynamic manner without having to manually reconfigure the network. Accordingly, there is a need for an out-of-band technique (i.e., outside of the logical application links) for the host to inform the control unit that new, different options are to be employed. Moreover, this out-of-band technique should be backward compatible to avoid disrupting normal operation of a control unit that is not configured to operate with the new options.

SUMMARY OF THE INVENTION

The invention comprises an option request protocol that allows dynamic negotiation of options between a host computer and a control unit of a computer network. The protocol is manifested as an exchange of novel control messages over a control link used to establish logical data links for communication between the host and control unit. The options negotiated by the control message exchange generally pertain to additional functions performed by the control unit or host, or additional parameters for communication over the data links coupling the control unit and host.

Specifically, the option request protocol defines a fixed-length control message having a unique format comprising a header and a body. A command field of the header contains command codes specifying the type of control message, such as an option request message or an option request response message. The body of the control message includes an option name field and an option-specific parameter field whose contents may vary depending upon the type of option requested.

According to an aspect of the invention, the control unit or the host may initiate negotiation of an option by issuing an option request message over the control link. For example, the host may function as an option requester by generating and sending an option request message to the control unit. Upon receipt of the request, the control unit functions as an option responder by returning an option request response; such a response may include a generic return code (such as "option accepted" or "option not supported") is or an option-specific return code (pertaining to the specifically-requested option). If the option responder is not configured to operate with the novel protocol, no response is returned. According to a time-out aspect of the invention, if a response is not received within a predetermined time period, the option requester may assume that the option responder does not "understand" the option request protocol and negotiation terminates.

An advantage of the inventive protocol is that it facilitates dynamic negotiation between a host and a control unit without prior configuration constraints. Although the control unit is generally programmed with option-specific information, that information may be dynamically selected by a host using the option request/response message exchange. In addition, the time-out feature of the invention specifies a backward compatible mechanism for reliable operation among host computers or control units that are not configured to operate in accordance with the option request protocol.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
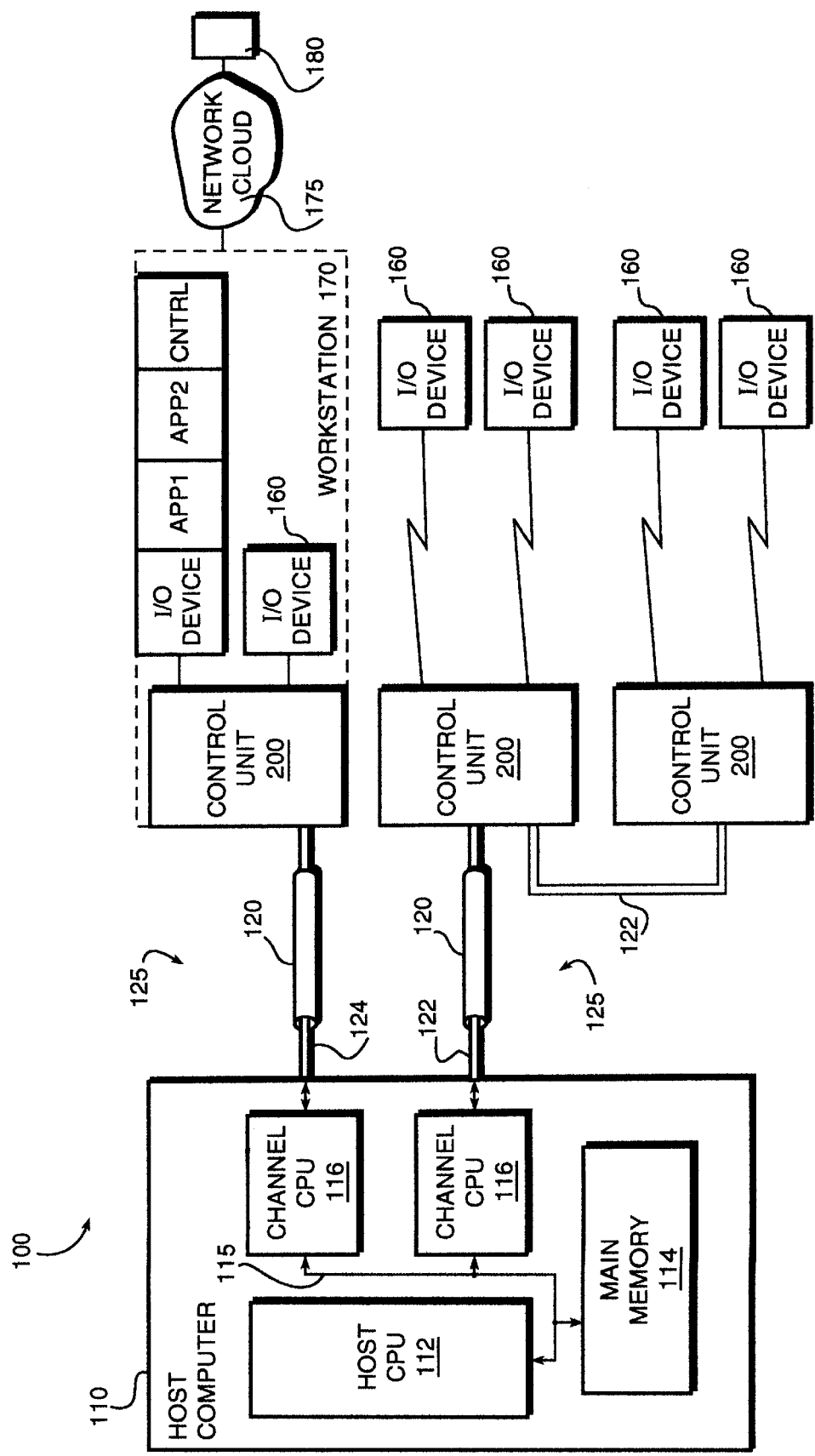
FIG. 1 is a block diagram of a computer network comprising a collection of interconnected nodes, such as a host computer and at least one control unit.

FIG. 1 is a block diagram of a computer network 100 comprising a collection of interconnected nodes, such as a host computer 110 and at least one control unit 200. The host computer comprises a host central processing unit (CPU 112), a main memory 114 and at least one channel CPU 116 interconnected by a bus 115. Communication link 120 couples the channel CPU 116 to the control unit 200 which, in turn, is directly attached to input/output (I/O) devices 160. In an embodiment of the network 100 that may be advantageously used with the invention, the control unit and I/O devices may be combined to form an integrated node, such as a workstation 170, which is coupled to an end station 180 via a network (e.g., SNA or IP) cloud 175. In the illustrative embodiment described herein, however, the control unit 200 is an independent node comprising, inter alia, a router for routing data through the network to destination nodes (shown as end stations 180). Communication among the nodes is typically effected by exchanging discrete frames or packets of data according to predefined protocols.

For each node, the memory may comprise storage locations addressable by the CPUs for storing software programs and data structures associated with the inventive protocol and messages. Moreover, the CPUs may comprise processing elements or logic for executing the software programs and manipulating the data structures. An operating system, portions of which are typically resident in memory and executed by the CPU, functionally organizes the node by, inter alia, invoking network operations in support of software processes executing on the node. It will be apparent to those skilled in the art that other CPU and memory means, including various computer readable media, may be used for storing and executing program instructions pertaining to the inventive techniques described herein.

The channel CPU and communication link collectively interact to form a mainframe channel 125 to effectively separate execution of I/O operations from the host computer's execution of data processing programs. Each I/O device 160 is represented by a subchannel (not shown) that provides information about the I/O device and its attachment to the channel 125. Functionally, the channel CPU 116 manages the protocol over the communication link 120 and controls transfer of data directly between main memory 114 and the control unit 200. To that end, the channel CPU may use one or more logical and physical links of the channel 125 as the actual links between the host and the control unit. Examples of a physical transmission link include a bus-and-tag path 122 and an enterprise system connection (ESCON) path 124.

The bus-and-tag channel path 122 is a byte-wide parallel bus with data on one cable (the "bus") and a set of control lines on another cable (the "tag"). The control lines govern the transfer of control information and data over the parallel bus. For this path implementation, each channel is connected to a first control unit in a chain consisting of 1 to 8 control units. The chain acts as a bus, connecting each channel to a series of control units. The ESCON channel path 124, on the other hand, consists of a pair of fiber optic cables that employ a serial, packet-switching architecture with control information such as packet framing and cyclic redundancy check (CRC) characters. Standard bus-and-tag protocol indications are conveyed within packets instead of through bus-and-tag lines.

Figure 2:
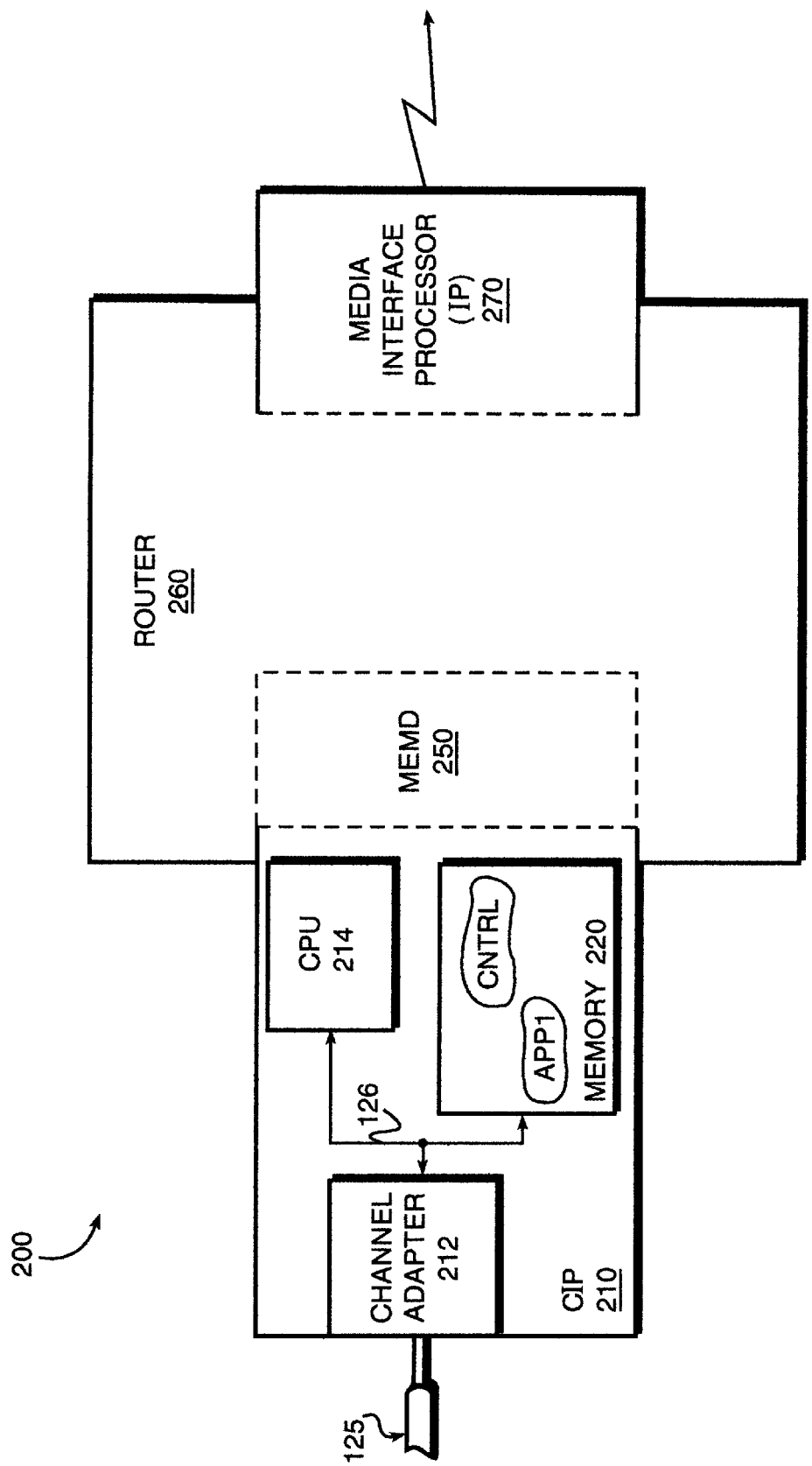
FIG. 2 is a block diagram of the control unit of FIG. 1.

FIG. 2 is a block diagram of an illustrative embodiment of the control unit 200 comprising an inbound or channel interface processor (CIP) 210, a memory switching fabric (MEMD) 250, a router 260 and an outbound or media interface processor (IP) 270. The IP 270 provides an outbound interface connection to a plurality of different wide area and local area network media (e.g., token ring, FDDI and Ethernet) to enable transfer of data packets over those media. The router 260 is configured to facilitate the flow of the data packets throughout the network by routing them to proper destination nodes.

The CIP 210 provides high-performance, multiprotocol network access to the host computer 110 and, to that end, includes a channel adapter 212 that directly couples to the channel 125 and, in particular, to the physical bus-and-tag and ESCON channel paths. A CPU 214 and memory 220 of the CIP cooperate with the channel 125 to relieve the host 110 from tasks associated with direct communication with destination nodes, such as workstations, thereby saving host resources while allowing concurrent data and I/O processing. Control and application programs stored in the memory 220 communicate with respective programs in the host via the exchange of data packets such as, e.g., IP data packets, in accordance with a protocol such as the common link access to workstation (CLAW) protocol.

The CLAW protocol generally defines command codes associated with channel command words (CCWs); logical links are defined in CCWs for read and write operations to establish multiple logical connections within subchannels directed to different applications executing on the host and CIP. The protocol enables efficient switching among applications specified by these logical links to facilitate data transfers to appropriate outbound media through the IP 270. Logical link number 0 is reserved for a control link over which system validate and system validate response messages flow to verify the names of the CIP and host. Logical link numbers 1–31 specify application-to-application (data) links that are established by a connection request sequence between the host and CIP. Once established, various types of data may flow over these application-application links in accordance with specified CLAW parameters.

However, the CLAW protocol "statically" configures network communication according to the CLAW parameters and there is no way to negotiate changes to the parameters in a dynamic manner; that is, changes to the parameters are typically effected by manually reconfiguring the network. The present invention is directed to a technique for dynamically changing these parameters or invoking different options for data communication between the host and a control unit communicating using the CLAW protocol.

In accordance with the invention, an option request protocol is provided that allows dynamic negotiation of options between the host computer 110 and CIP 210 of network 100. The protocol is preferably manifested as an exchange of novel control messages over the control link used to establish logical data links for communication between the host and CIP. The options negotiated by the control message exchange generally pertain to additional functions performed by the CIP or host, or additional parameters for communication over the data links coupling the CIP and host.

Figure 3:
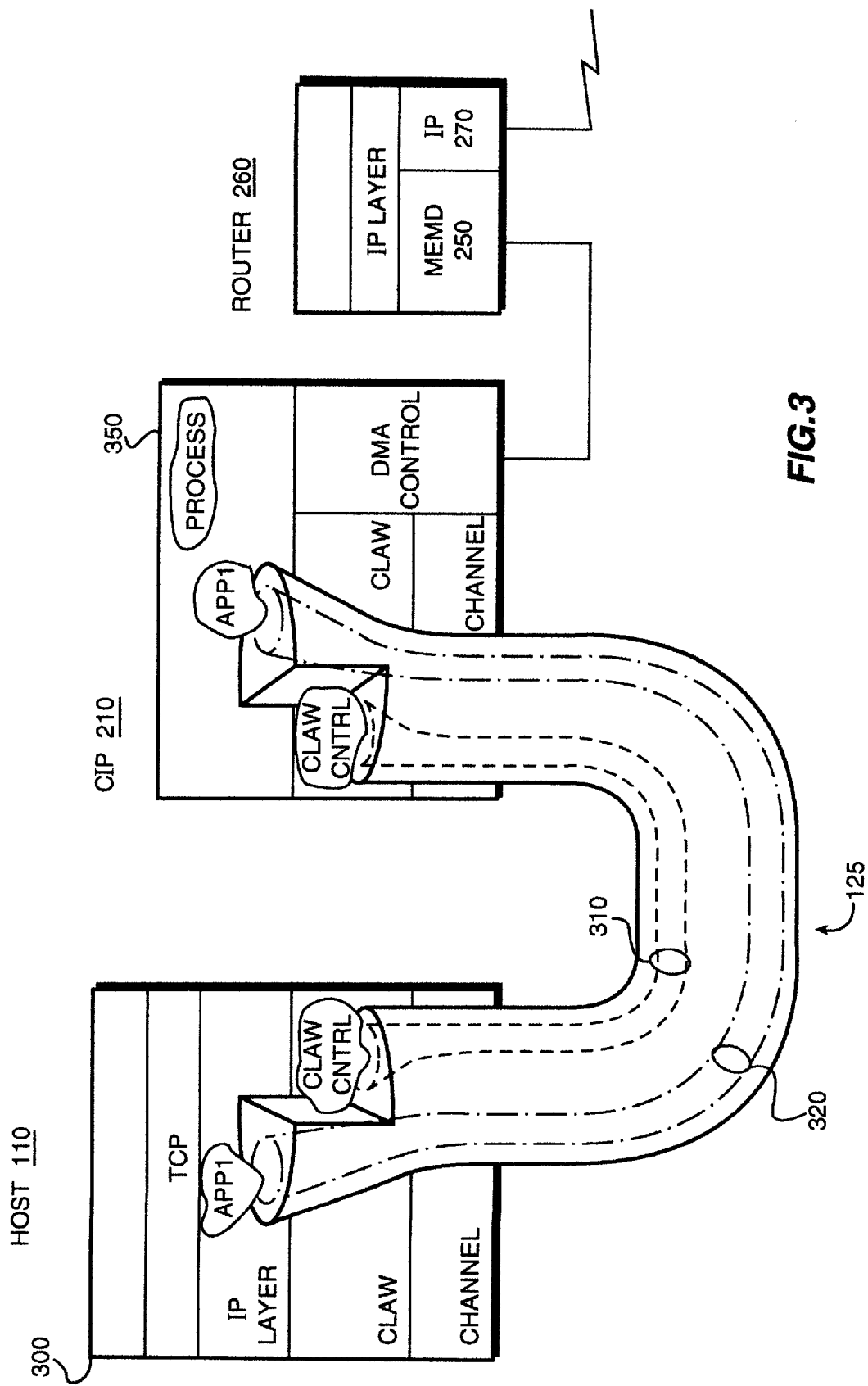
FIG. 3 is a schematic block diagram of protocol stacks within the host computer and the control unit for performing operations relating to an option request protocol according to the present invention.

In general, the option request protocol defines a message format for option request and option request response messages. Either the CIP or host may function as an option requester to initiate negotiation of an option by issuing an option request message over the control link. For example, the host functions as an option requester when generating and sending an option request message to the control unit. FIG. 3 is a schematic block diagram of the negotiating entities of protocol stacks 300, 350 within the host computer 110 and the CIP 210, respectively, for performing option request operations.

The negotiating entities are preferably CLAW applications residing within lower-level layers (e.g., internetwork and data link layers) of the protocol stacks. As used herein, a CLAW application is similar to a service access point in that it identifies a particular port (or access point) to a higher-level layer in a network node involved in a data exchange. A CLAW control entity (CLAW CNTRL) is provided in each node as an application layered upon a CLAW driver layer (CLAW); the CLAW CNTRL application is configured to handle all CLAW option requests.

Specifically, a system validate exchange occurs between CLAW CNTRL processes executing on the host and CIP to activate a control link connection (shown as dashed lines 310) over channel 125. Once the control link is activated, a connection request sequence is invoked among these CLAW CNTRL processes over link 310 to establish a logical application-application link (shown as dashed-dotted lines 320) for transferring data in response to execution of CCWs of a channel program at the host and CIP. For example, the connection request sequence may be used to establish a data link 320 for initiating the flow of IP datagrams between APP1 processes on the host and the CIP.

Figure 4:
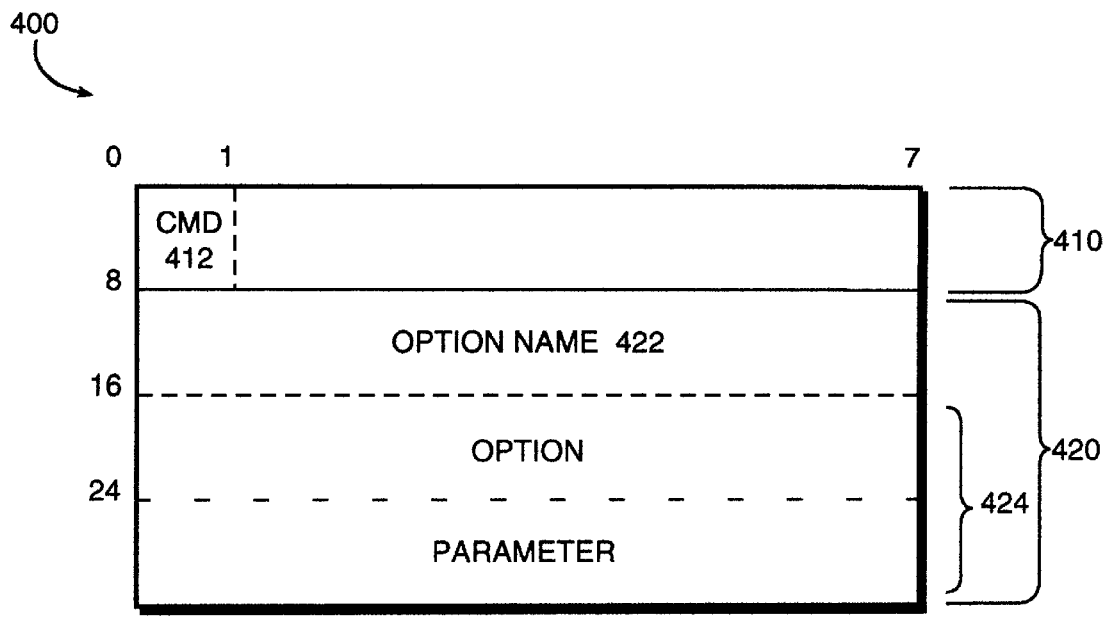
FIG. 4 is a block diagram of the format of an option request control message of the inventive option request protocol.

To initiate an option request sequence, the CLAW CNTRL process executing on, e.g., the host 110, functions as the option requester by generating an option request message and transmitting it over the control link to the CIP 210 where it is received at its CLAW CNTRL process, i.e., the option responder. FIG. 4 is a block diagram of the format of an option request control message 400 comprising an 8-byte header 410 and a 24-byte body 420. A 1-byte command (CMD) field 412 of the header 410 contains command codes specifying the type of message, such as an option request message (e.g., command code hex 31). The body 420 of the control message 400 includes an 8-byte option name (OPTION NAME) field 422 whose contents specify the name of the requested option and a 16-byte option-specific parameter (OPTION PARAMETER) field 424 containing any parameters specific to the requested option.

Figure 5:
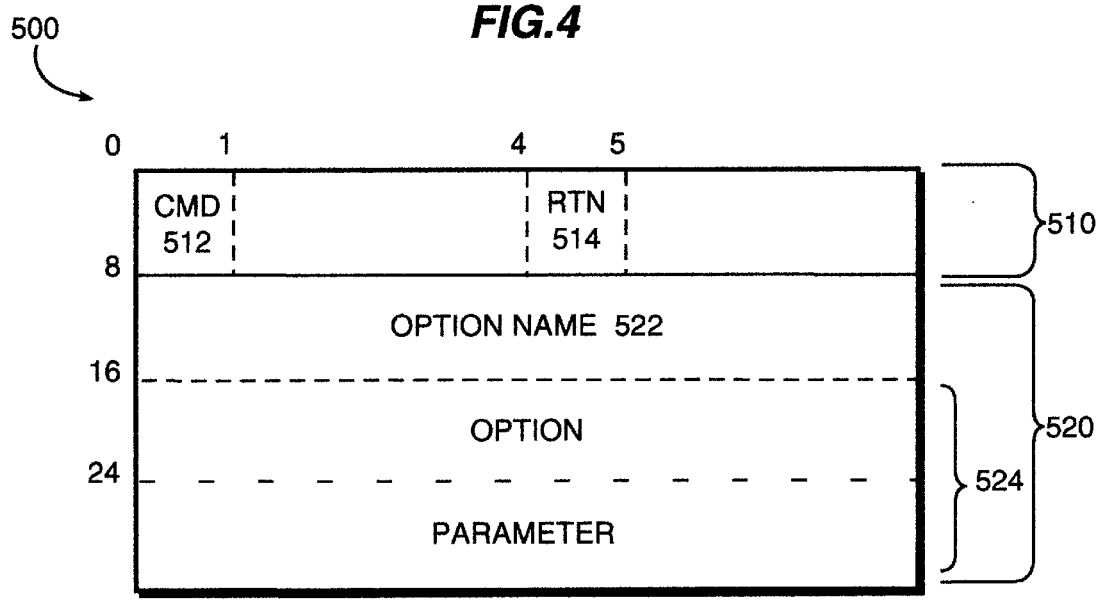
FIG. 5 is a block diagram of the format of an option request response control message of the inventive option request protocol.

In response to receiving the option request message 400, the option responder (CIP) returns an option request response; FIG. 5 is a block diagram illustrating the format of an option request response control message 500. As with the option request message 400, the option request response 500 comprises a header 510 and a body 520, the latter including an 8-byte option name (OPTION NAME) field 522 whose contents are copied from field 422 and a 16-byte option-specific parameter (OPTION PARAMETER) field 524 containing any option-specific response parameters. The header 510 comprises a 1-byte command (CMD) field 512 that contains command codes specifying the type of message, such as an option request response message (e.g., command code hex 32) and a 1-byte return (RTN) field 514 containing various return codes. Notably, the return codes may include a generic return code (such as "option accepted" or "option not supported") or an option-specific return code (pertaining to the specifically-requested option).

In accordance with a backward compatible aspect of the invention, if the option responder is not configured to operate with the novel protocol, no response is returned. Thus the invention provides a time-out mechanism whereby if an option request response message 500 is not received within a predetermined time period, the option requester may assume that the option responder does not "understand" the option request protocol and negotiation terminates.

An advantage of the inventive protocol is that it facilitates dynamic negotiation between a host and a control unit without prior configuration constraints. Although the control unit is generally programmed with option-specific information, that information may be dynamically selected by a host using the option request/response message exchange. In addition, the time-out feature of the invention specifies a backward compatible mechanism for reliable operation among host computers or control units that are not configured to operate in accordance with the option request protocol.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for dynamically negotiating an option between nodes of a computer network according to an option request protocol, the nodes being interconnected by control and data links of a channel, the method comprising the steps of:

creating an option request message in accordance with said protocol at an option requester node, the option request message comprising a header containing a command field whose contents identify the option request message and a body including (i) an option name field whose contents specify a name of the requested option and (ii) an option-specific parameter field containing any parameters specific to the requested option;

transmitting the option request message from the option requester node to an option responder node over the control link of the channel to initiate negotiation of an option pertaining to one of a function performed by the option responder node and a parameter for communication between the option requester node and option responder node over the data link of the channel;

responding to receipt of the option request message by creating an option request response message at the option responder node if the option responder node is configured to operate in accordance with said protocol, the option request response message comprising (1) a header containing (i) a command field whose contents identify the option request response message and (ii) a return field containing a return code, and (2) a body including (i) an option name field and (ii) an option-specific parameter field containing any parameters specific to the response; and transmitting the option request response message from the option responder node to the option requester node over the control link if the option responder node is configured to operate in accordance with said protocol, the option request response message indicating that the requested option is one of accepted and rejected by the option responder node;

wherein if the option responder node is not configured to operate in accordance with said protocol, said option responder node does not transmit any response message to said option requester node in response to the receipt of the option request from the option requester node, the option requester node being configured to terminate the negotiation of the option with the option responder node if the option response message is not received by the option requester node within a predetermined time period.

2. The method of claim 1 wherein the option requester node is one of a host computer and a control unit and wherein the option responder node is the other of the control unit and the host computer.

3. The method of claim 1 wherein the option requester node comprises one of a control process executing on a host computer and a control process executing on a control unit, and wherein the option responder node comprises the other of the control applications executing on the control unit and the host computer.

4. The method of claim 3 wherein the return code comprises one of a generic return code and an option-specific return code, and wherein the generic return code comprises one of option-accepted and option-not-supported.

5. The method of claim 3 further comprising the step of exchanging system validate and system validate response messages between the control processes executing on the control unit and the host computer to activate the control link of the channel.

6. Apparatus for dynamically negotiating an option between nodes of a computer network according to an option request protocol, the nodes interconnected by control and data links of a channel, the protocol comprising:

an option requester for creating an option request message comprising a header containing a command field whose contents identify the option request message and a body including (i) an option name field whose contents specify a name of the requested option and (ii) an option-specific parameter field containing any parameters specific to the requested option;

an option responder for creating if said option responder is configured to operate in accordance with said protocol, an option request response message comprising (1) a header containing (i) a command field whose contents identify the option request message and (ii) a return field containing a return code and (2) a body including (i) an option name field and (ii) an option-specific parameter field containing any parameters specific to the response;

a transmitter for transmitting the option request message from the option requester to the option responder over the control link of the channel to initiate negotiation according to said protocol of an option pertaining to one of a function performed by the option responder and a parameter for communication between the option requester and option responder over the data link of the channel; and a transmitter for transmitting the option request response message from the option responder if the option responder is configured to operate in accordance with said protocol, to the option requester over the control link to indicate that the requested option is one of accepted and rejected by the option responder;

wherein if the option responder is not configured to operate in accordance with said protocol, said option responder does not create any message in response to the option request message, the option requester being configured to terminate the negotiation of the option if the option request response message is not received by the option requester within a predetermined time period.

7. The apparatus of claim 6 wherein the transmitter for transmitting the option request message comprises a channel central processing unit (CPU) of a host computer.

8. The apparatus of claim 7 wherein the transmitter for transmitting the option request response message comprises a channel adapter of a control unit.

9. Apparatus for dynamically negotiating an option between nodes of a computer network using an option request protocol, the nodes interconnected by control and data links of a channel, the apparatus comprising:

an option requester for creating an option request message comprising a body having an option name field whose contents specify a name of the requested option and an option-specific parameter field containing any parameters specific to the requested option; and means for transmitting the option request message from the option requester to an option responder over the control link of the channel to initiate negotiation of an option pertaining to one of a function performed by the option responder and a parameter for communication between the option requester and option responder over the data link of the channel;

wherein the option requester is configured to terminate the negotiation of the option if an option response message from the option responder is not received by the option requester within a predetermined time period.

10. The apparatus of claim 9 wherein the option request message further comprises a header containing a command field whose contents identify the option request message.

11. The apparatus of claim 9 wherein the option requester is a control process of a computer.

12. The apparatus of claim 11 wherein the computer is a host computer and wherein the control process is a common link access to workstation (CLAW) application residing within lower-level layers of a protocol stack of the host computer.

13. The apparatus of claim 9 wherein the option requester is a control process of a control unit.

14. The apparatus of claim 13 wherein the control process is a common link access to workstation (CLAW) application residing within lower-level layers of a protocol stack of the control unit.

15. Apparatus for dynamically negotiating an option between nodes of a computer network using an option request protocol, the nodes being interconnected by control and data links of a channel, the apparatus comprising:

an option responder for creating if the option responder is configured to operate in accordance with said protocol, an option request response message in response to receipt of an option request message, the option response message comprising a body including an option name field and an option-specific parameter field containing any parameters specific to the response and if the option responder is not configured to operate in accordance with said protocol, the option responder is configured not to create any message in response to the receipt of the option request message; and means for transmitting the option request response messages, if the option responder is configured to operate in accordance with said protocol, from the option responder to an option requester over the control link to indicate that a requested option is one of accepted and rejected by the option responder.

16. The apparatus of claim 15 wherein the option request response message further comprises a header containing a command field whose contents identify the option request response message and a return field containing a return code.

17. The apparatus of claim 15 wherein the option responder is a control process of a control unit.

18. The apparatus of claim 17 wherein the control process is a common link access to workstation (CLAW) application residing within lower-level layers of a protocol stack of the control unit.

19. The apparatus of claim 15 wherein the option responder is a control process of a computer.

20. The apparatus of claim 19 wherein the computer is a host computer and wherein the control process is a common link access to workstation (CLAW) application residing within lower-level layers of a protocol stack of the host computer.

* * * * *